United States Patent
Comps et al.

(10) Patent No.: US 8,350,921 B2
(45) Date of Patent: Jan. 8, 2013

(54) VIDEO PROCESSING SYSTEM, INTEGRATED CIRCUIT, SYSTEM FOR DISPLAYING VIDEO, SYSTEM FOR GENERATING VIDEO, METHOD FOR CONFIGURING A VIDEO PROCESSING SYSTEM, AND COMPUTER PROGRAM PRODUCT

(75) Inventors: Christophe Comps, Cugnaux (FR); Patrice Bertrand, Toulouse (FR); Klaus Foerster, Toulouse (FR); Michel Thomas, Saint Lys (FR)

(73) Assignee: Freescale Semiconductor, Inc., Austin, TX (US)

( * ) Notice: Subject to any disclaimer, the term of this patent is extended or adjusted under 35 U.S.C. 154(b) by 420 days.

(21) Appl. No.: 12/598,294

(22) PCT Filed: May 10, 2007

(86) PCT No.: PCT/IB2007/052712
§ 371 (c)(1),
(2), (4) Date: Oct. 30, 2009

(87) PCT Pub. No.: WO2008/139274
PCT Pub. Date: Nov. 20, 2008

(65) Prior Publication Data
US 2010/0134645 A1 Jun. 3, 2010

(51) Int. Cl.
*H04N 5/228* (2006.01)
(52) U.S. Cl. .............. 348/222.1; 348/273; 348/272; 348/280
(58) Field of Classification Search ............... 348/222.1, 348/273, 272, 280
See application file for complete search history.

(56) References Cited

U.S. PATENT DOCUMENTS

| 6,853,382 | B1 | 2/2005 | Van Dyke et al. |
| 6,975,354 | B2* | 12/2005 | Glotzbach et al. ............ 348/273 |
| 2004/0131276 | A1 | 7/2004 | Hudson |
| 2005/0145701 | A1 | 7/2005 | Silverbrook et al. |
| 2005/0146613 | A1 | 7/2005 | Silverbrook et al. |
| 2005/0162449 | A1 | 7/2005 | Silverbrook |
| 2005/0210405 | A1 | 9/2005 | Ernst et al. |
| 2005/0219559 | A1 | 10/2005 | Ito et al. |
| 2005/0257075 | A1 | 11/2005 | Sako et al. |
| 2005/0257239 | A1 | 11/2005 | Evans et al. |

FOREIGN PATENT DOCUMENTS

| EP | 1175101 A | 1/2002 |
| WO | 97/04401 A | 2/1997 |

OTHER PUBLICATIONS

International Search Report and Written Opinion correlating to PCT/IB2007/052712 dated Mar. 4, 2008.

* cited by examiner

*Primary Examiner* — Yogesh Aggarwal

(57) ABSTRACT

A video processing system may include a video input and a video output for outputting manipulated video images. The system may have a video processing chain connecting the video input to the video output. The chain may include a series connection of two or more video processing components. The components may each include a component input for receiving video images and a component output for outputting processed video images. A control input may be present for controlling the video processing component to be in an enabled or a disabled state. The video processing component may be arranged to obtain in the enabled state the processed video images by performing a respective processing operation on the received video images; and to obtain in the disabled state the processed video images by forwarding the received video images to the component output without performing the processing operation.

20 Claims, 2 Drawing Sheets

VIDEO PROCESSING SYSTEM, INTEGRATED CIRCUIT, SYSTEM FOR DISPLAYING VIDEO, SYSTEM FOR GENERATING VIDEO, METHOD FOR CONFIGURING A VIDEO PROCESSING SYSTEM, AND COMPUTER PROGRAM PRODUCT

FIELD OF THE INVENTION

This invention relates to a video processing system, to an integrated circuit, to a system for displaying video, to a system for generating video, to a method for configuring a video processing system, and to a computer program product.

BACKGROUND OF THE INVENTION

Video processing systems are known in the art. For example, personal computers with graphic cards are known. Typically, the graphics card is provided with a set of video processing algorithms and is able to execute a selected video processing algorithm. A software application running on the personal computer can invoke and control the execution of one or more video processing algorithms in a certain order, for instance to capture a video from a camera.

A disadvantage of the known video processing systems is, however, that the video processing system has to be implemented again for each different application. For example, the software application has to select the algorithms, define their order and ensure a transfer of the processed video images from one algorithm to another. Also, the algorithms are application specific requiring the development of a large number of different algorithms for the different possible applications.

SUMMARY OF THE INVENTION

The present invention provides a video processing system, an integrated circuit, a system for displaying video, a system for generating video, a method for configuring a video processing system, and a computer program product as described in the accompanying claims.

Specific embodiments of the invention are set forth in the dependent claims.

These and other aspects of the invention will be apparent from and elucidated with reference to the embodiments described hereinafter.

BRIEF DESCRIPTION OF THE DRAWINGS

Further details, aspects and embodiments of the invention will be described, by way of example only, with reference to the drawings.

DETAILED DESCRIPTION OF THE PREFERRED EMBODIMENTS

Figure 1:
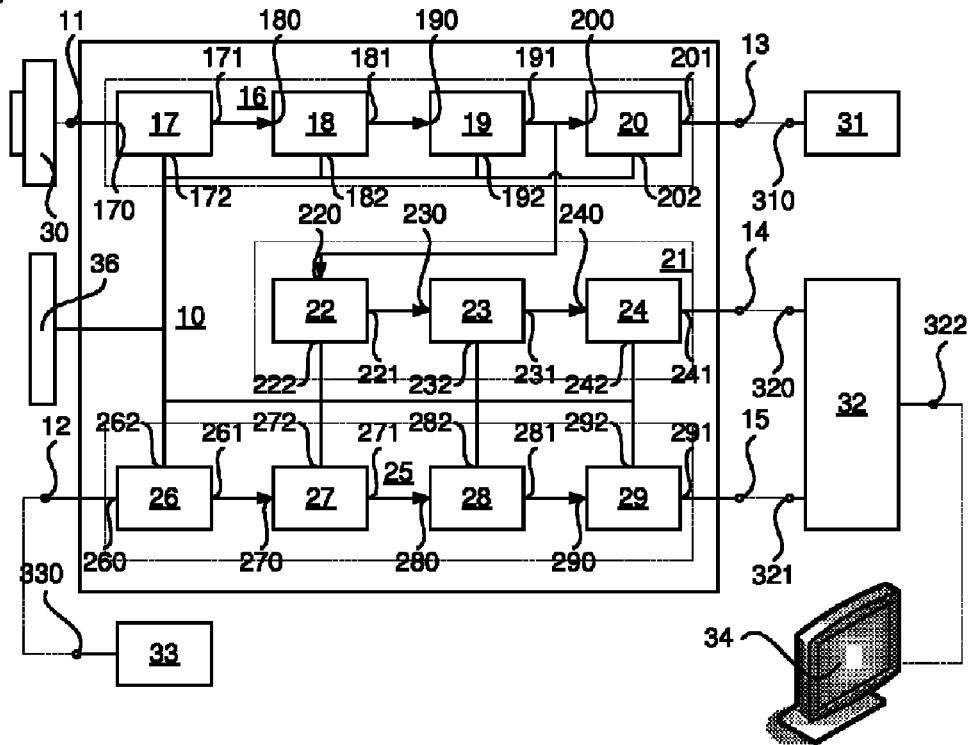
FIG. 1 schematically illustrates an example of an embodiment of a video processing system.

Referring to FIG. 1, an example of a video processing system 10 is illustrated. The video processing system 10 may, as illustrated, include one or more video inputs 11, 12 and one or more video outputs 13-15. At the video inputs 11, 12 data representing one or more video images may be received. The video images may for instance be unprocessed video images, e.g. from a camera 30, or be processed video images, such as video images presented at an output 330 of a video decoder 33. At the video outputs 13-15 manipulated video images may be outputted. As illustrated, the video processing system 10 may include one or more video processing chains 16, 21, 25 which connect a respective video input 11, 12 to one or more of the video outputs 13-15. The chain 16, 21, 25 may include a series connection of at least two video processing components 17-20; 22-24; 26-29.

The respective video processing components 17-20; 22-24; 26-29 may include a component input 170, 180, 190, 200, 220, 230, 240, 260, 270, 280, 290 and a component output 171, 181, 191, 201; 221, 231, 241; 261, 271, 281, 291. At the component input, video images may be received by the respective component. Processed video images may be outputted at the component output.

As illustrated, each of the video processing components 17-20; 22-24; 26-29 may further include a control input 172, 182, 192, 202, 222, 232, 242, 262, 272, 282, 292. Via the control input the video processing component may be controlled to be in an enabled or a disabled state. Furthermore, one or more parameters of a processing operation to be performed by the video processing component may be controlled via the control input, such as e.g. the resolution of an image, the output format or other parameters. As shown in FIG. 1, the control inputs may for instance be connected to a mode controller 36 which can control the state of the individual video processing components 17-21; 22-24; 26-29.

In the enabled state, the respective video processing component 17-20; 22-24; 26-29 may obtain the processed video images by performing a respective processing operation on the received video images.

In the disabled state, the processed video images are inputted to a node downstream of the video processing component without being subjected to the processing operation. Thus, the video images received by a video processing component in the disabled state are received by the component or output positioned downstream and directly adjacent of the respective disabled component without being subjected to the processing operation. Accordingly, by setting the mode of the video processing components in a chain 16,21,25, the respective chain 16,21,25 can perform a selected sequence of video processing operations. Thereby, the video processing system 10 can be used for a large variety of applications, while the need for a complete overhaul of the video processing system 10 for each application may be obviated.

The video processing chains may be implemented in any manner suitable for the specific implementation. As shown in FIG. 1, the video processing chain 16,21,25 may be implemented as a chain in which the video images pass through (at least a part of) the video processing component without being subject to the processing operation thereof. For instance, the video processing component 17-20; 22-24; 26-29 may be transparent in the disabled mode or the video processing component 17-20; 22-24; 26-29 may obtain the processed video images by forwarding the received video images to the component output without performing the processing operation.

Figure 2:
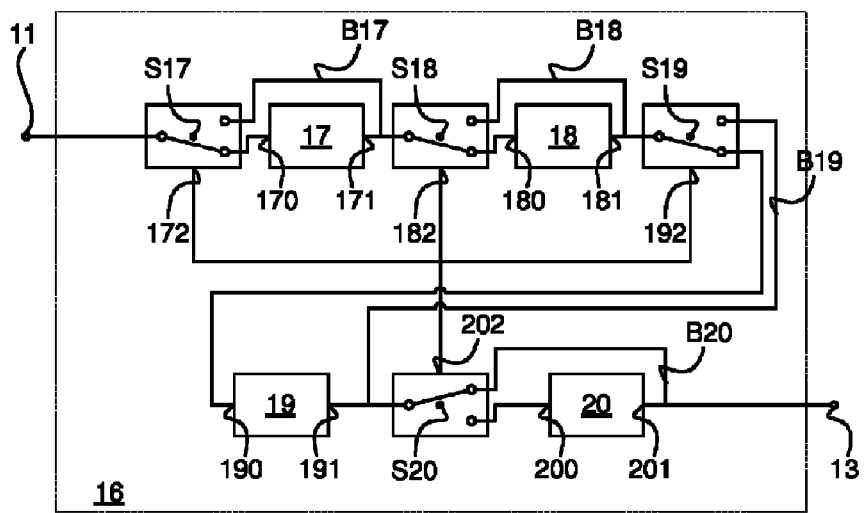
FIG. 2 schematically illustrates an example of an embodiment of a video processing chain.

As shown in FIG. 2 the video processing chain 16,21,25 may also be implemented as a chain which includes one or more bypasses paths B17-B20 which can be used to bypass a disabled video processing component. In the example of FIG. 2, at the input of switching devices S17-S20 the video images for a video processing component can be received. The switching devices S17-S20 are connected with a first output to the video processing component and with a second output, via the bypass path B17-B20, to a downstream video processing component which is positioned, in a video processing direction, downstream of this video processing component or to the end of the chain 16. In the example of FIG. 2, for example, the bypass paths B17-B20 connect a switch output positioned upstream of the video processing component to a, directly adjacent, downstream node (the node being in FIG. 2 the input of a downstream switching device S18-S20 or the chain output 13). The switching device S17-S20 can be controlled via the control input 172,182,192,202 to connect its input to a selected one of its outputs. Accordingly, the switching device S17-S20 can either input received images into a video processing component (in which case the video processing component is enabled) or to input the video images into a video processing component downstream thereof via a bypass B17-B20 (in which case the video processing component is disabled).

The switching devices may be implemented in any manner suitable for the specific implementation. The switching device may for instance be implemented as a hardware or software device which copies the data presented at its input to its output, a device which re-routes the data flow while bypassing the processing of the respective video processing components. The switching device may also be implemented as a direct memory access (DMA) mechanism which is used by the mode controller to transfer data between blocs and which is dynamically reprogrammed to bypass the disabled components. However, the switching devices may also be implemented in a different manner.

As shown in FIG. 1, a video input 11 may be connectable to a camera 30 and the video processing system may include a first video output 14 connectable to a display device 34, such as a liquid crystal display, a cathode ray monitor, a projection system or other device for visually outputting images, and a second video output 13 connectable to a video coding or video storage device 31. The two or more video processing chains may then include a first chain 21, such as a preview or viewfinder chain, connecting the video input 11 to the first video output 14. The first chain 21 may be arranged to pre-process the video images received at the video input in a manner suitable to be outputted by the display device.

As shown in FIG. 1, for instance, the first chain may resize the video images and/or adjust the colours and/or rotate or mirror the video images, such that they can be displayed together with video images from another chain at the same display in a manner convenient for a user of the display. For instance, the video images outputted by the first chain may be manipulated such that they have the same orientation and/or colour spectrum as the video images from the other chain or be resized such that they are (much) smaller than the video images from the other chain.

The second chain may connect the video input 11 to the second video output 13 and for example pre-process video images received at the video input in a manner suitable for the video coding device or a video storage device. For instance, the second chain may digitally zoom in the video images and/or reduce the dimensions of the video images and/or adjust the colour spectrum of the images and/or change the orientation of the video images before they are transmitted to e.g. a video encoder 31 downstream of the second chain 16.

The video processing system 10 may for instance include two or more video outputs 13-15 and two or more video processing chains 16,21,25, each of the chains connecting a video input to a respective one of the video outputs. In the example of FIG. 1, for instance, chains 15,21 connect the same video input 11 to different video outputs 13 resp. 14. As shown in FIG. 1, the video processing system 10 may for example include a pre-processing chain 16. The pre-processing chain may for instance connect a video acquiring device, such as a video camera, to an input 310 of a video encoder 31 or to a video storage device, as illustrated in FIG. 1 with the video capture chain 16. The chain may for example be a post-processing chain which for instance connects a source of processed video images, such as a video decoder 33, to a visual output device such as a display 34.

As illustrated with the arrows in FIG. 1, the video processing chain may include a video processing component positioned upstream (in a processing direction of the video images) in a chain 16,21,25 which is connected with the respective output 171, 181, 191; 221, 231; 261, 271, 281 to the input 181, 191, 201; 221, 231, 241; 271, 281, 291 of a downstream video processing component 18-20; 22-24; 26-29. As illustrated in FIG. 1, the chains 16,21,25 may include a most upstream video pre-processing component 17; 22; 26 connected to the respective video input 11,12 and a most downstream video pre-processing component 20,24,29 which is connected to a respective video output 13-15.

As shown in the example with a post-processing chain 25, the video processing system 10 may include a linear, un-branched chain, in which each upstream component is connected to a single downstream component, as for example illustrated with a downsize component 28. However, the video processing system may also or alternatively include a branched chain, as illustrated with a viewfinder chain 21 which is a branch of a pre-processing chain 16. Thereby, video components 17-19 can be shared by two or more chains and hence the amount of components in the video processing system 10 may be reduced. In the branched chain 16,21, one or more upstream components may be connected to two or more downstream components, as e.g. illustrated with a mirror and flip component 20 and a downsize component 22.

In the enable mode, for instance, an upstream component may perform a processing operation on the received video images at its input and transmit the processed video images to the input of a downstream, directly adjacent video processing component in the chain 16,21,25. In case the upstream component is in the disabled mode, the upstream component may simply forward the received video images and hence be regarded as transparent. The downstream component may then perform, when in the enabled mode, its respective video processing operation and thereafter transmit the, thus processed, video images further. Thus, the video processing system 10 may be configured to perform a desired sequence of two or more video processing operations by simply putting the components for the desired operations in the enabled mode and the putting the components for the not-desired operations in the disabled mode.

The video processing chains may include any video processing components suitable for the specific implementation. As shown in the example of FIG. 1, the pre-processing chain 16 may for instance include, in the processing direction, a digital zoom component 17, a downsize component 18, a colour space conversion component 19 and a rotate, mirror and flip component 20. It has been found such a pre-processing chain can be used in a large variety of applications.

The view-finder chain 21 may for example be connected to the output of the colour space conversion component 19. The view-finder chain 21 may include, in addition to the colour space conversion component 19 and the other components in the pre-processing chain 16 upstream of the colour space conversion component 19, a downsize component 22, a colour space conversion component 23 and a rotate, mirror and flip component 24. It has been found such a view-finder chain 21 can be used in a large variety of applications.

The post-processing chain 25 may for instance include, in the processing direction, a post-filtering component 26 (which may filter, e.g. deblocking or deringing, an image after decompression to enhance the image, for example to remove artefacts caused by image compression), a colour space conversion component 27, a downsize component 28 and a rotate, mirror and flip component 29. It has been found such a post-processing chain 25 can be used in a large variety of applications. It will be appreciated that video processing components, such as a colour space conversion component or a rotate, mirror and flip component, are known in the art and for sake of briefness the components are not described in full detail.

The video processing components may be disabled or enabled depending on the specific application. Tables 1 show examples of mode selection of for the video processing components in the example of FIG. 1 for different scenarios of use of a combined video generating and displaying system, such as a mobile phone or other apparatus with a camera and a display. As can be derived form table 1, the video processing system 10 may be adjusted in a simple manner for the specific application, such as for instance for processes with different orientation of an image capturing device and/or display device.

For example, scenarios 1 and 2 may relate to an image and video capture process with a simultaneous display of the captured image or video in a viewfinder window (e.g. to allow an operator to view the image or video that is being captured), without displaying video from other sources. Scenarios 3 and 4 may relate to a process in which at the same time images or videos are being captured and video received from a source is being displayed.

In table 1, scenario 1 represents a case in which a camera is positioned at a side opposite to the display, with the display in portrait mode. Scenario 2 represents a case in which a camera can be either at the same side as the display or at a side opposite to the display, with the display in portrait mode. Scenario 3 represents a case in which a camera is positioned at the same side as the display, with the display in portrait mode and with a connection to a source of processed video images, such as to a voice and video over IP network (V2IP), a video decoder or other source of processed video images. Scenario 4 represents a case in which a camera is positioned at the same side as the display, with the display in landscape mode and with a connection to a source of processed video images, such as to a voice and video over IP network (V2IP), a video decoder or other source of processed video images.

include a camera 30 which can capture video images. The camera 30 may for instance be connected to the video input to which a pre-processing chain 16 is connected and the output of the pre-processing chain 16 may for instance be connected to a video encoder, a video storage device (which may include volatile or non-volatile memory, such as hard disk, a flash memory or other) or a network such as a V2IP network.

In the foregoing specification, the invention has been described with reference to specific examples of embodiments of the invention. It will, however, be evident that various modifications and changes may be made therein without departing from the broader spirit and scope of the invention as set forth in the appended claims. For example, the video processing system 10 may be implanted as an integrated circuit. Also, for example, downstream of the video processing system 10, further processing devices may be provided, such as a device 32 that is connected with inputs 320,321 to different video processing chains 21,25 and combines separate video images from different sources into a single video image in order to output the video images simultaneously at an output 322 of the device 32. Also, the viewfinder chain 21 in the example of FIG. 1 may be implemented as a chain separate from the pre-processing chain and e.g. be directly connected to camera 30, via the video input 11. Furthermore, one or more of the chains 16,21,25 may be used to process a single image. For instance, the pre-processing chain 16 may process a picture taken with a (digital) camera while viewfinder chain 21 display video in order to enable an operator of the system 10 to select a the picture.

Also, the invention is not limited to physical devices or units implemented in non-programmable hardware but can also be applied in programmable devices or units able to perform the desired device functions by operating in accordance with suitable program code. The invention may also be implemented in a computer program for running on a computer system, at least including code portions for performing functions of a video processing system when run on a programmable apparatus, such as a computer system or enabling a programmable apparatus to perform functions of a device or system according to the invention. Such a computer program may be provided on a data carrier, such as a CD-rom or diskette, stored with data loadable in a memory of a computer system, the data representing the computer program. The data carrier may further be a data connection, such as a telephone cable or a wireless connection.

Furthermore, the devices may be physically distributed over a number of apparatuses, while functionally operating as

TABLE 1

| chain | component | scenario 1 | scenario 2 | scenario 3 | scenario 4 |
|---|---|---|---|---|---|
| pre-processing | digital zoom | enable | enable | enable | enable |
| | downsize | enable | enable | enable | enable |
| | colour space conversion | enable | enable | enable | enable |
| | rotate, mirror and flip | disable | enable | disable | enable |
| view-finder | downsize | enable | enable | enable | enable |
| | colour space conversion | enable | enable | enable | enable |
| | rotate, mirror and flip | disable | enable | enable | enable |
| post-processing | post filtering | disable | disable | enable | enable |
| | colour space conversion | disable | disable | enable | enable |
| | downsize | disable | disable | enable | enable |
| | rotate, mirror and flip | disable | disable | enable | disable |

Figure 3:
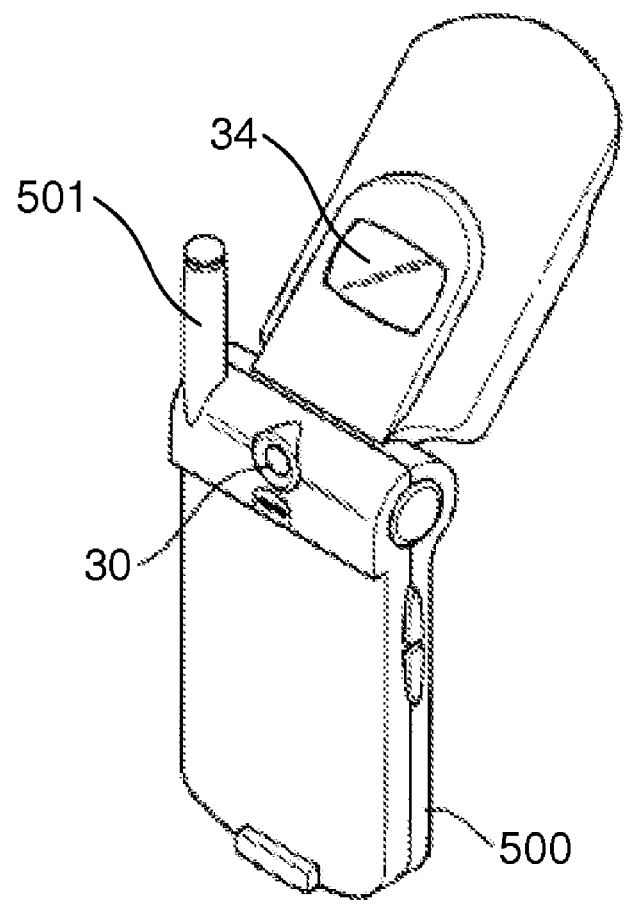
FIG. 3 schematically illustrates an example of an embodiment of a combined video generating and displaying system.

FIG. 2 schematically shows an example of a combined system 500 for displaying and acquiring video. As shown, the system 500 may include a display 34 connected to an output of the video processing system 10, at which the video images can be visually outputted. The system 500 may further a single device. For example, the video processing components may be implemented as discrete hardware components connected in a manner suitable to form the video processing system. Also, unless specified otherwise, the elements may be connected in any manner suitable to transfer the video images from or to the respective elements. The connections may for example be direction connections or indirect connections. For instance, although the video processing system 10 and the display 34 are connected in the example of FIG. 3, further processing components may be present between the video processing system 10 and the display 34, such as the device 32. Also, for instance, the video storage device 31 may be connected with an output to the post-processing chain 25, for instance to enable a visual output of a picture taken with a camera on a display of said camera.

However, other modifications, variations and alternatives are also possible. The specifications and drawings are, accordingly, to be regarded in an illustrative rather than in a restrictive sense.

In the claims, any reference signs placed between parentheses shall not be construed as limiting the claim. The word 'comprising' does not exclude the presence of other elements or steps then those listed in a claim. Furthermore, the words 'a' and 'an' shall not be construed as limited to 'only one', but instead are used to mean 'at least one', and do not exclude a plurality. The mere fact that certain measures are recited in mutually different claims does not indicate that a combination of these measures cannot be used to advantage.

The invention claimed is:

1. A video processing system comprising:
   a video input;
   a video output for outputting at least one manipulated video image;
   a video processing chain connecting said video input to said video output, said chain including a series connection of at least two video processing components, each including:
      a component input for receiving at least one video image;
      a component output for outputting at least one processed video image;
      a control input for controlling the video processing component to be in an enabled state or a disabled state, said video processing component being arranged to obtain in said enabled state the processed video image by performing a respective processing operation on the received video images, in which disabled state the processed video image is inputted to a node downstream of the video processing component in the disabled state without being subjected to said processing operation.

2. A video processing system as claimed in claim 1, including at least two video outputs and at least two video processing chains, each of said chains connecting said video input to a respective one of said video outputs.

3. A video processing system as claimed in claim 2, wherein:
   said video input is connectable to a camera;
   said at least two video outputs comprising:
      a first video output connectable to a display device for visually outputting the video images and
      a second video output connectable to a video coding device or a video storage device, said at least two video processing chains include:
         a first chain, connecting said video input to said first video output, arranged to pre-process said at least one video image received at the video input in a manner suitable to be outputted by said display device, and
         a second chain, connecting said video input to said second video output, arranged to pre-process the video images received at the video input in a manner suitable for said video coding device or a video storage device.

4. A video processing system as claimed in claim 2, wherein at least one of said at least two chains is a branch of another of said at least two chains.

5. A video processing system as claimed in claim 1, comprising:
   a video input connectable to a video coding device or a video storage device;
   a video display output connectable to a display device; and
   a post-processing chain connecting said video input to said second video output, said post-processing chain is arranged to post-process the video images received at the video input in a manner suitable to be outputted by said device.

6. A video processing system as claimed in claim 1, wherein at least one of the video processing components includes a configuration control input for configuring at least one parameter of the processing operation.

7. An integrated circuit including a video processing system as claimed in claim 1.

8. A video processing system as claimed in claim 3, wherein at least one of said at least two chains is a branch of another of said at least two chains.

9. A video processing system as claimed in claim 3, including:
   a video input connectable to a video coding device or a video storage device;
   a video display output connectable to a display device; and
   a post-processing chain connecting said video input to said second video output, said post-processing chain is arranged to post-process the video images received at the video input in a manner suitable to be outputted by said display device.

10. A video processing system as claimed in claim 4, including:
    a video input connectable to a video coding device or a video storage device;
    a video display output connectable to a display device; and
    a post-processing chain connecting said video input to said second video output, said post-processing chain is arranged to post-process the video images received at the video input in a manner suitable to be outputted by said display device.

11. A video processing system as claimed in claim 2, including:
    a video input connectable to a video coding device or a video storage device;
    a video display output connectable to a display device; and
    a post-processing chain connecting said video input to said second video output, said post-processing chain is arranged to post-process the video images received at the video input in a manner suitable to be outputted by said display device.

12. A video processing system as claimed in claim 2, wherein at least one of the video processing components includes a configuration control input for configuring at least one parameter of the processing operation.

13. A system for displaying video, including
    a video processing system as claimed in claim 1 and
    a display device connected to a video output of said video processing system.

14. A system for acquiring video, comprising:
    a camera;

a video processing system as claimed in claim 1 connected with a video input to said camera, for receiving unprocessed video images from said camera; and optionally a video coding device and/or a video storage device connected to a video output of said video processing system.

15. A method for configuring a video processing system, the method comprising:

enabling or disabling at least one video processing component of a video processing system, wherein the video processing system comprises:

a video input;

a video output for outputting at least one manipulated video image;

a video processing chain connecting said video input to said video output, said chain including a series connection of at least two video processing components, each including:

a component input for receiving at least one video image;

a component output for outputting at least one processed video image;

a control input for controlling the video processing component to be in an enabled state or a disabled state, said video processing component being arranged to obtain in said enabled state the processed video image by performing a respective processing operation on the received video images, in which disabled state the processed video image is inputted to a node downstream of the video processing component in the disabled state without being subjected to said processing operation.

16. A method as claimed in claim 15, including at least two video outputs and at least two video processing chains, each of said chains connecting said video input to a respective one of said video outputs.

17. A method as claimed in claim 16, wherein:

said video input is connectable to a camera;

said at least two video outputs comprising:

a first video output connectable to a display device for visually outputting the video images and a second video output connectable to a video coding device or a video storage device, said at least two video processing chains include:

a first chain, connecting said video input to said first video output, arranged to pre-process said at least one video image received at the video input in a manner suitable to be outputted by said display device, and a second chain, connecting said video input to said second video output, arranged to pre-process the video images received at the video input in a manner suitable for said video coding device or a video storage device.

18. A method as claimed in claim 16, wherein at least one of said at least two chains is a branch of another of said at least two chains.

19. A method as claimed in claim 15, comprising:

a video input connectable to a video coding device or a video storage device;

a video display output connectable to a display device; and a post-processing chain connecting said video input to said second video output, said post-processing chain is arranged to post-process the video images received at the video input in a manner suitable to be outputted by said display device.

20. A method as claimed in claim 15, wherein at least one of the video processing components includes a configuration control input for configuring at least one parameter of the processing operation.

* * * * *